(12) United States Patent
Gazit et al.

(10) Patent No.: US 12,161,071 B2
(45) Date of Patent: Dec. 10, 2024

(54) PRESSURE REDUCING VALVE WITH SHUT-OFF MECHANISM

(71) Applicant: NETAFIM, LTD., Tel Aviv (IL)

(72) Inventors: Bar Gazit, Kibbutz Mishmar Hanegev (IL); Gad Peleg, Kibbutz Hulda (IL)

(73) Assignee: NETAFIM, LTD., Tel Aviv (IL)

( * ) Notice: Subject to any disclaimer, the term of this patent is extended or adjusted under 35 U.S.C. 154(b) by 609 days.

(21) Appl. No.: 17/497,394

(22) Filed: Oct. 8, 2021

(65) Prior Publication Data

US 2022/0022391 A1 Jan. 27, 2022

Related U.S. Application Data

(63) Continuation-in-part of application No. PCT/IB2020/053143, filed on Apr. 2, 2020.

(60) Provisional application No. 62/830,575, filed on Apr. 8, 2019.

(51) Int. Cl.
| | |
|---|---|
| *A01G 25/16* | (2006.01) |
| *F16K 1/12* | (2006.01) |
| *F16K 31/122* | (2006.01) |
| *F16K 31/126* | (2006.01) |
| *G05D 16/10* | (2006.01) |
| *A01G 25/02* | (2006.01) |

(52) U.S. Cl.
CPC .............. *A01G 25/16* (2013.01); *F16K 1/126* (2013.01); *F16K 31/1221* (2013.01); *F16K 31/1223* (2013.01); *G05D 16/106* (2013.01); *A01G 25/02* (2013.01)

(58) Field of Classification Search
CPC ........ A01G 25/16; A01G 25/02; F16K 1/126; F16K 31/1221; F16K 31/1223; G05D 16/106; G05D 16/103; Y10T 137/7808
See application file for complete search history.

(56) References Cited

U.S. PATENT DOCUMENTS

| | | | | |
|---|---|---|---|---|
| 5,860,447 A | * | 1/1999 | Chu ..................... | G05D 16/103 |
| | | | | 137/493.9 |
| 6,374,853 B1 | | 4/2002 | Callies | |
| 7,048,010 B2 | * | 5/2006 | Golan .................... | A01G 25/02 |
| | | | | 138/119 |
| 7,401,622 B2 | | 7/2008 | Ungerecht | |
| 2003/0155433 A1 | * | 8/2003 | Gregory ................ | B05B 1/3026 |
| | | | | 239/203 |
| 2004/0261859 A1 | | 12/2004 | Callies | |
| 2006/0137745 A1 | * | 6/2006 | Carnall ................. | F16K 17/046 |
| | | | | 137/505.25 |

(Continued)

FOREIGN PATENT DOCUMENTS

| | | | | | |
|---|---|---|---|---|---|
| GB | | 2421560 A | * | 6/2006 | ........... F16K 17/046 |

OTHER PUBLICATIONS

International Search Report issued Aug. 17, 2020, in counterpart International (PCT) Application No. PCT/IB2020/053143.

(Continued)

*Primary Examiner* — Marina A Tietjen
(74) *Attorney, Agent, or Firm* — Womble Bond Dickinson (US) LLP (57) ABSTRACT

A pressure regulator valve for regulating pressures within a portion of an irrigation system, can also be used to shut off downstream flow into the portion of the irrigation system in response to an incoming command arriving via an incoming port into the regulator.

26 Claims, 5 Drawing Sheets

(56) References Cited

U.S. PATENT DOCUMENTS

| | | |
|---|---|---|
| 2007/0284004 A1* | 12/2007 | Ungerecht ......... G05D 16/0655 137/505.25 |
| 2011/0175009 A1 | 7/2011 | Kristoffersen |
| 2012/0285557 A1 | 11/2012 | Ungerecht et al. |
| 2016/0286744 A1 | 10/2016 | Socolsky et al. |
| 2020/0026313 A1 | 1/2020 | Weingarten |

OTHER PUBLICATIONS

Written Opinion issued Aug. 17, 2020, 2020, in counterpart International (PCT) Application No. PCT/IB2020/053143.

* cited by examiner

PRESSURE REDUCING VALVE WITH SHUT-OFF MECHANISM

RELATED APPLICATIONS

This is a Bypass Continuation of International Application No. PCT/IB2020/053143 filed Apr. 2, 2020 and published as WO 2020/208483A1. Priority is claimed to U.S. Provisional Patent Application No. 62/830,575 filed Apr. 8, 2019. The contents of the aforementioned applications are incorporated by reference in their entirety.

TECHNICAL FIELD

Embodiments of the invention relate to a pressure reducing flow regulator and/or valve, in particular for use in agricultural irrigation applications.

BACKGROUND

Pressure reducing flow regulators and/or valves can be used for regulating irrigation systems for providing substantial constant outgoing pressures or flow for a large range of incoming pressures. Such regulating can be useful in various irrigation applications, such as in relative low-pressure systems since small changes in pressure may result in relative large variations in pressures as opposed e.g. to irrigation systems that function at high pressures.

US2011175009 is an example of a fluid pressure regulating unit that includes fluid inlet and outlet ports and a valve means and biasing means. The biasing means urge the valve means in the direction of an open position and an auxiliary valve biasing means is provided for biasing the valve means in the direction of a closed position.

Often, during use of an irrigation system shut-off of flow may also be required and it would be useful to combine pressure and/or flow regulating together with a valve type ability in a single device.

SUMMARY

The following embodiments and aspects thereof are described and illustrated in conjunction with systems, tools and methods which are meant to be exemplary and illustrative, not limiting in scope.

In an embodiment there is provided a pressure regulator for regulating pressures within a portion of an irrigation system. The pressure regulator is arranged to also shut off downstream flow into the portion of the irrigation system in response to an incoming command arriving via an incoming port into the regulator.

In embodiments, the pressure regulator may this be seen as providing a dual purpose of pressure regulation and valve utilities in a single device.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 1:
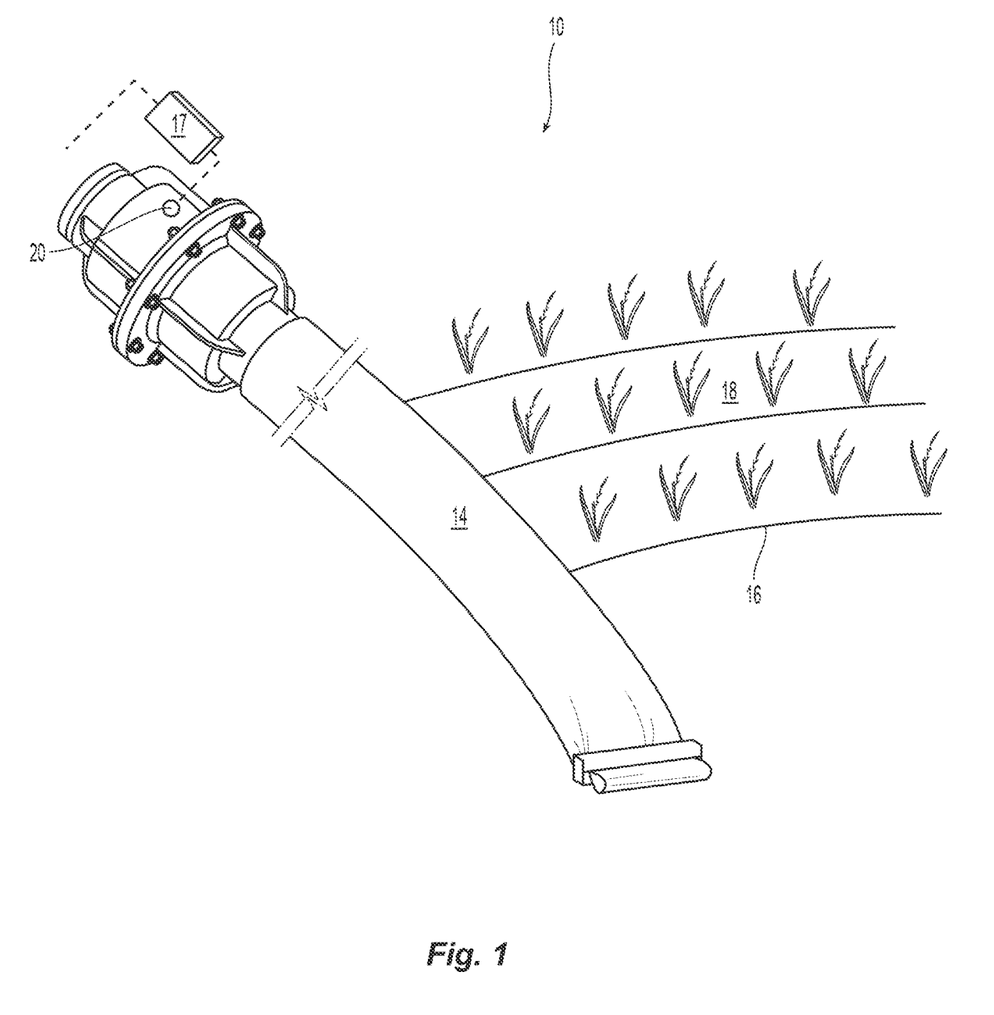
FIG. 1 schematically shows an irrigation system including an embodiment of a pressure and/or flow regulating valve of the invention at an upstream end.

Attention is first drawn to FIG. 1 illustrating a portion of an exemplary irrigation system 10 including a pressure and/or flow regulating valve 12 according to an embodiment of the present invention adjacent an upstream side of this portion of the system. In the illustrated example, the irrigation system here includes a main irrigation pipe 14 and drip irrigation pipes 16 in liquid communication with main pipe 14 that branch away from the main pipe to irrigate crops 18 in a field.

In certain embodiments—main pipe 14 may be an irrigation pipe suitable to withstand pressures up to a certain given pressure threshold. For example, main pipe 14 may be a collapsible pipe with a pipe wall that includes materials such as fabric(s) and laminate(s) layers—which are designed to withstand internal pressures within the pipe of up to the given pressure threshold. Collapsible pipes, sometimes referred to as lay-flat pipes, are typically arranged to expand and assume a generally more circular profile in cross section under internal liquid pressure and a more flattened profiled upon drop in internal liquid pressures.

Valve 12 in its various embodiments may include an incoming valve command port 20 located at a relative upstream side of the regulator. Incoming valve command port 20 may provide a pathway for incoming pressure commands into the valve. In the example of FIG. 1, an external controller 17 (e.g. electrically controlled valve) may be associated with valve 12 for controlling transmission of incoming pressure commands into valve 12.

Controller 17 in this optional example may be in fluid communication with pressurized liquid located upstream to valve 12 within system 10 and consequently may be arranged to control communication of pressure commands from upstream of the valve towards its interior. In other embodiments—controller 17 may be arranged to control communication of pressures into valve 12 from other sources—i.e. not necessarily from other locations within the system such as upstream of the valve as discussed.

Figure 2:
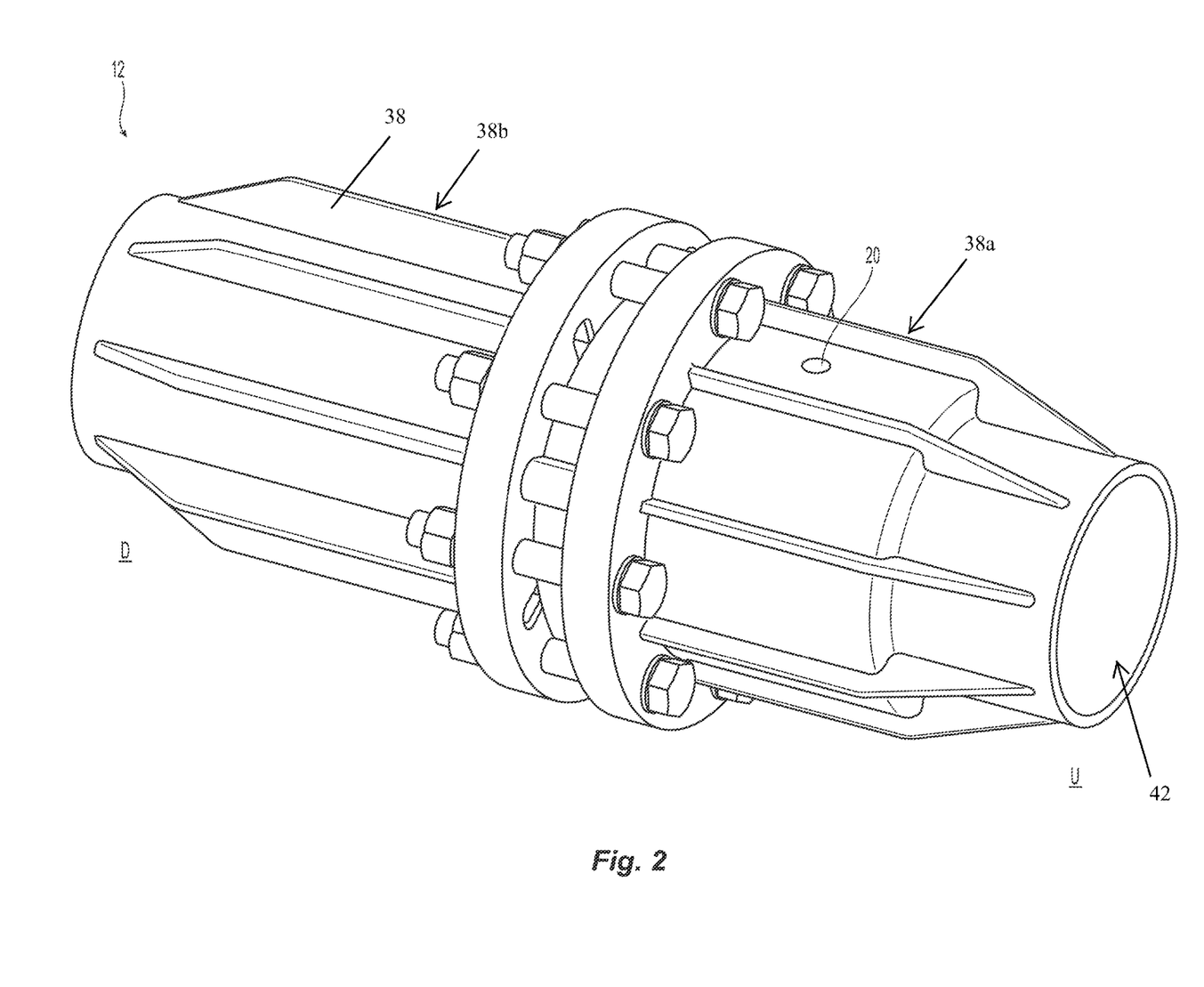
FIG. 2 schematically shows a perspective view of an embodiment of a pressure and/or flow regulating valve of the invention.
Figure 3:
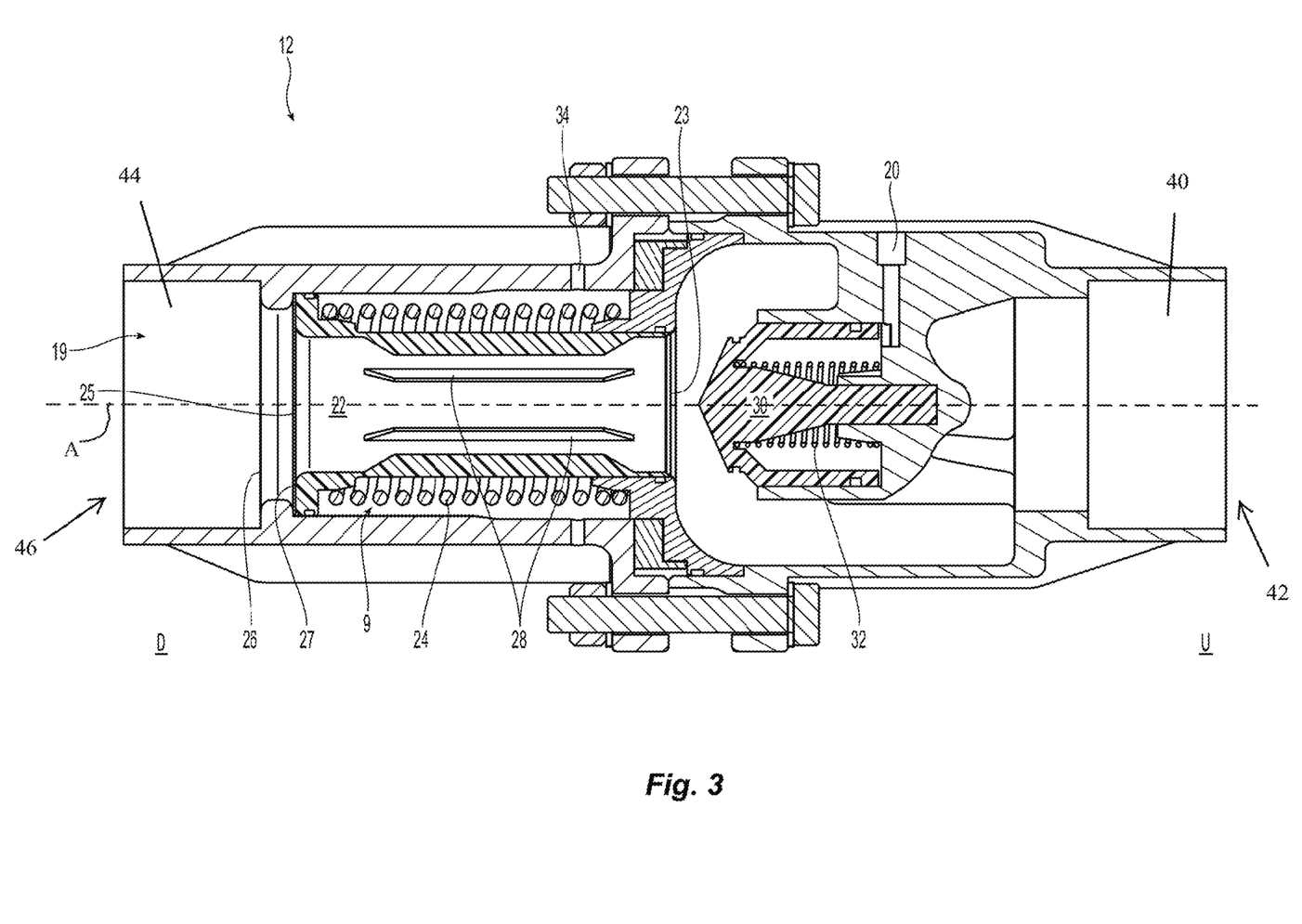
FIGS. 3 to 5 schematically show cross sections view of the regulator of FIG. 2 during various stages of pressure regulating.
Figure 4:
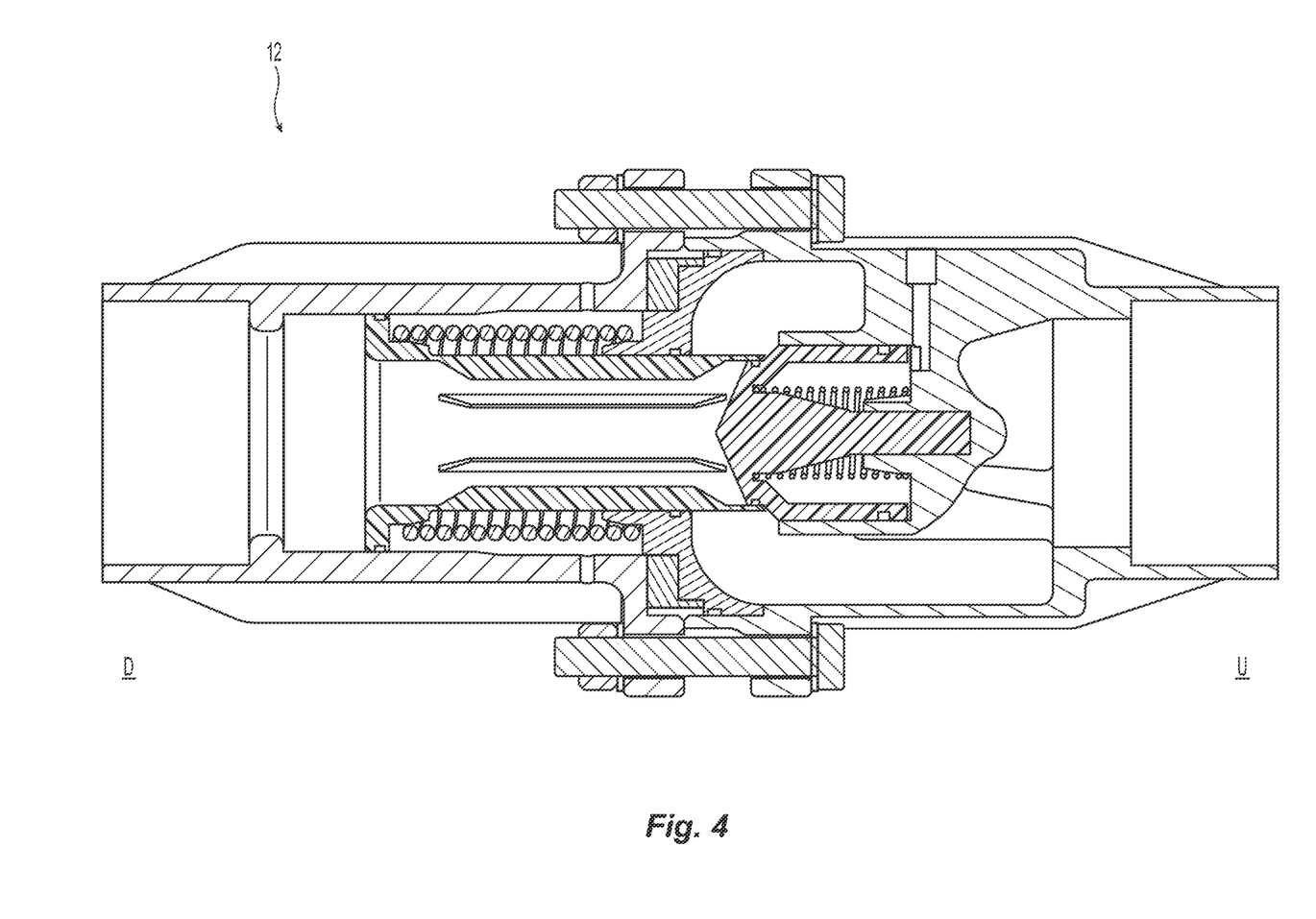
Figure 5:
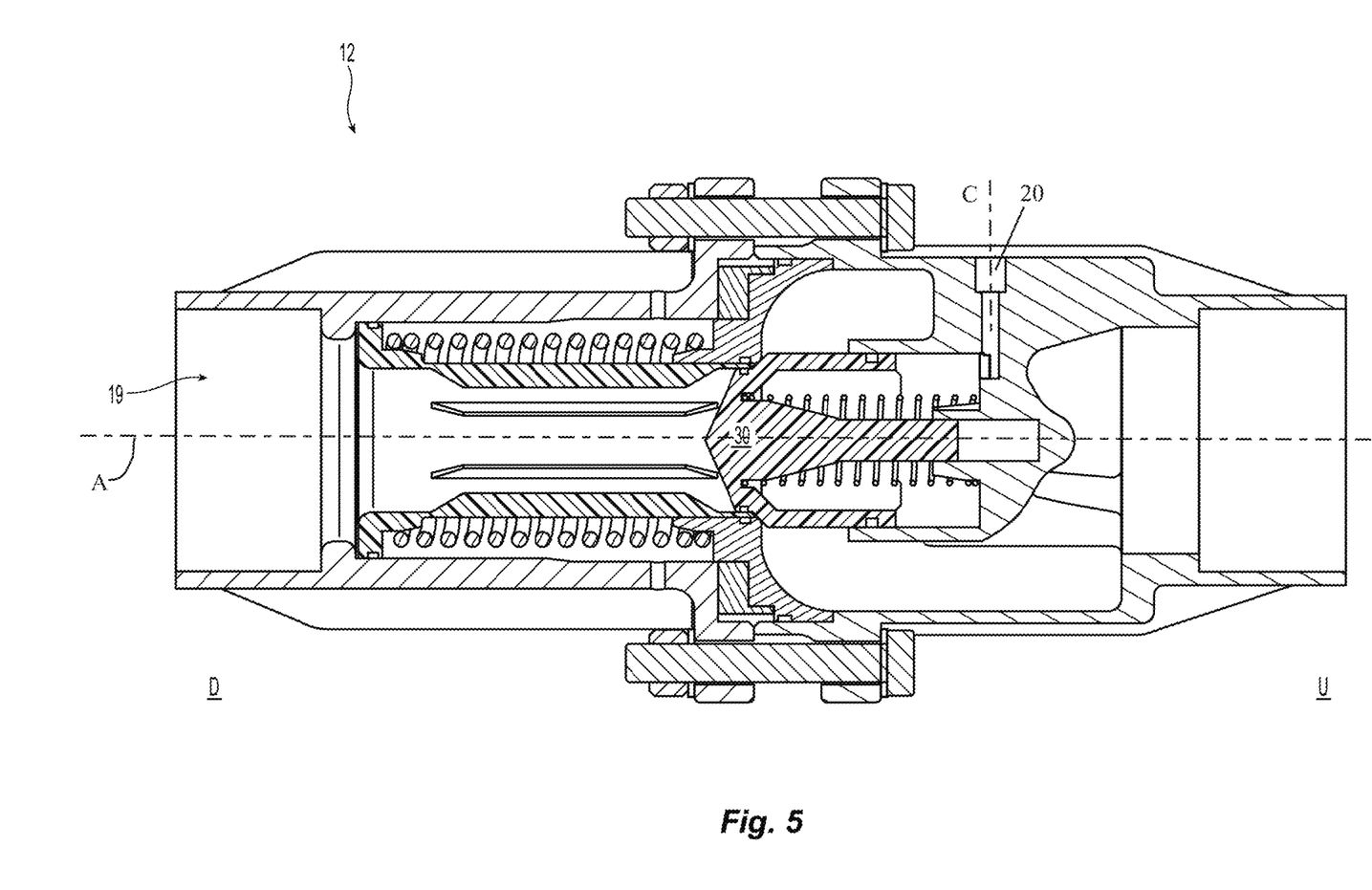

Attention is drawn to FIG. 2 illustrating a perspective view of an embodiment of a pressure and/or flow regulating valve 12 generally similar to that illustrated in FIG. 1. In FIG. 2 and in the following FIGS. 3 to 5, illustrating cross sectional views of valve 12, the upstream 'U' and downstream 'D' sides of the valve are indicated.

Valve 12 has a longitudinal axis A and a housing 38 comprising a first housing portion 38a proximate the upstream side U and a second housing portion 38b proximate the downstream side D, the two housing portions being bolted together in this embodiment. An inlet cap 40 having a valve inlet 42 is located at the upstream side U and an outlet cap 44 having a valve outlet 46 is located at the downstream side D. The inlet cap 40 and the outlet cap 44 are arranged at opposite ends of the housing 38, along the common longitudinal axis A. Valve 12 in the illustrated examples has an internal flow path 19 extending axially therethrough and opening out of the valve at its downstream and upstream sides at the valve outlet 46 and the valve inlet 42, respectively. Along flow path 19, valve 12 includes a flow stem 22 and a biasing means 24 (in this example a compression spring) that is arranged to bear in a downstream direction against the flow stem to press it towards a stop 26 here formed as an annular rim on a surface of the outlet cap 44. Biasing means 24 is located within a spacing 9 formed between an outer side of flow stem 22 and an inner side of the regulator's housing 38.

Formed along an internal face of flow stem 22 are flow straighteners 28 here formed as axial extending ribs—that are arranged to enhance laminar flow through the flow stem. Flow stem has an upstream entry 23 and a downstream exit 25 in form of a shoulder formation having a downstream facing shoulder face 27.

Flow stem 22 at entry 23 may be arranged to end at a generally sharp annular profile with minimal upstream directed facets. Upstream to entry 23 the regulator includes a plug 30 here exemplified as including an optional biasing assisting means 32 located within an internal cavity of the plug. Biasing assisting means 32 may e.g. be a tension spring arranged to pull (bias) the plug in the upstream direction. Incoming valve command port 20 is arranged to communicate with the plug's internal cavity.

In FIGS. 3 and 4—plug 30 is shown in a non-activated state retracted in an upstream direction within its seat. To assist this state of the plug, incoming port may be open for communication with atmospheric pressure at the ambient environment. Vents 34 may also be provided through the housing of the regulator for venting to the ambient environment spacing 9 where biasing means 24 is located.

Such venting may substantially prevent or limit unintended build-up of forces (such as suction) that may be formed within spacing 9 from acting against flow stem 22 when it moves back and forth along the regulator's axis during pressure regulating actions. The vents 34 may be formed at a relative upstream portion of spacing 9 to ensure venting of the spacing also during instances where flow stem 22 is situated at a relative upstream location.

Liquid flow entering the valve from upstream is adapted to build-up and transmit pressures present upstream of the valve to locations downstream along the valve. As pressure downstream of the flow stem rises—this pressure bears in an upstream direction against the flow stem's shoulder face 27.

Since the flow stem is designed to include downstream facing surfaces (e.g. at shoulder face 27) that are larger than upstream facing surfaces (e.g. at the flow stem's entry 23)—the balance of forces acting against the flow stem 22 may urge it in an upstream direction towards the position illustrated in FIG. 4 after overcoming the counteracting forces of biasing means 24.

In positions intermediate to those shown in FIGS. 3 and 4—movement of the flow stem 22 upstream is adapted to reduce the passage between flow stem 22 and plug 30 resulting in pressure decrease at locations downstream to the flow stem. This may urge the flow stem 22 to slow its upstream motion and possibly also move back downstream. Such axial fluctuations of the flow stem 22 are adapted to regulate the flow rate through the valve 12 so that it provides a substantially constant outlet pressure at its outlet over a range of inlet pressures for which it is designed to function.

In an aspect of the present invention— valve 12 may be controlled to shut liquid flow flowing downstream though its flow path 19. FIG. 5 exemplifies such shutting-off of downstream flow. The valve command port 20 has a command port axis C which is transverse to the valve's longitudinal axis A. A pressure signal entering the valve via the valve command port 20 may be arranged to bear against the internal cavity of plug 30 and by that urge the plug in a direction transverse to the command port axis C, downstream to press against entry 23 of the flow stem and/or against portions of the regulator adjacent entry 23. In such case, the pressure signal overrides the flow-regulating mechanism of the flow stem 22.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A flow regulating irrigation valve (12) having a longitudinal axis (A) defining an upstream side (U) and a downstream side (D), the valve comprising:
   a valve housing (38) extending along the longitudinal axis (A) and comprising:
      an inlet cap (40) located at the upstream side (U) and an outlet cap (44) located at the downstream side (D), the inlet cap (40) and the outlet cap (44) being arranged along the longitudinal axis (A) at opposite ends of the valve housing (38),
   a valve inlet (42) formed in the inlet cap (40) at the upstream side (U),
   a valve outlet (46) formed in the outlet cap (44) at the downstream side (D), and a valve command port (20) configured to receive an incoming command;

a flow stem (22) mounted in the housing (38) along the longitudinal axis (A), the flow stem (22) having an upstream entry (23) and a downstream exit (25) proximate the valve outlet 46; and a movable plug (30) mounted in the housing along the longitudinal axis (A) mounted upstream of the flow stem (22) and configured to shut off liquid flow through the flow stem (22) by moving towards the downstream side and sealing the upstream entry (23) of the flow stem (22), in response to an incoming command received at the valve command port (20).

2. The valve according to claim 1, further comprising:
a tension spring (32) configured to bias the plug (30) toward the upstream side (U).

3. The valve according to claim 1, wherein:
the valve command port (20) is configured to communicate with an internal cavity of the plug (30).

4. The valve according to claim 1, wherein:
the plug (30) is centered along the longitudinal axis (A) and is configured to move solely towards the downstream side along the longitudinal axis, in response to said incoming command.

5. The valve according to claim 1, wherein:
the valve housing (38) comprises a first housing portion (38a) proximate the upstream side (U) and a second housing portion (38b) proximate the downstream side (D); and
the plug (30) is principally located in the first housing portion (38a) and the flow stem (22) is principally located in the second housing portion (38b).

6. The valve according to claim 1, wherein:
the flow stem (22) and the outlet cap (44) are configured to regulate fluid pressure at the valve outlet (46) over a range of fluid pressures presented at the valve inlet (42).

7. The valve according to claim 6, wherein:
the flow stem (22) is configured to move in both upstream and downstream directions to regulate pressure downstream of the valve; and
upstream and downstream movement of the flow stem (22) changes a passage formed between the flow stem (22) and the plug (30).

8. The valve according to claim 7, wherein increase and decrease of said passage affects increase and decrease in pressure downstream of the valve, respectively.

9. The valve according to claim 1, wherein:
the flow stem (22) has an internal surface comprising a plurality of axially extending ribs (28) configured to enhance laminar flow through the flow stem.

10. The valve according to claim 1, wherein:
in the absence of said incoming command, an internal flow path (19) is established between the valve inlet (42) and the valve outlet (46), the internal flow path passing around the plug (30) and through the flow stem (22).

11. The valve according to claim 10, wherein:
in the absence of said incoming command, the valve command port (20) is exposed to the ambient environment.

12. The valve according to claim 1, further comprising:
spring means (24) configured to bias the flow stem (22) towards the downstream side, in the direction of a stop (26).

13. The valve according to claim 12, wherein:
the spring means (24) is located within a spacing (9) formed between an outer surface of the flow stem (22) and an inner surface of the valve housing (38).

14. The valve according to claim 13, further comprising:
one or more vents (34) formed through the housing where the spring means (24) is located, the vents (34) configured to vent the spacing (9) to the ambient environment.

15. An irrigation system (10) comprising:
a valve (12) in accordance with claim 1;
a main irrigation pipe (14) coupled to the valve outlet (46);
a plurality of drip irrigation pipes (16) connected to the main irrigation pipe (14) and configured to supply irrigation liquid to crops (18) in an irrigation field; and
an external controller (17) connected to the valve command port (20) and configured to selectively cause an incoming command to be presented at the valve command port (20) and shut-off flow of irrigation fluid to the main irrigation pipe (14).

16. The irrigation system according to claim 15, wherein the main irrigation pipe (14) is a collapsible pipe.

17. The irrigation system according to claim 15, wherein the incoming command is a pressure command.

18. The irrigation system according to claim 15, wherein the incoming command arrives from a portion of the irrigation system upstream of the valve.

19. A flow regulating irrigation valve (12) having a longitudinal axis (A), an upstream side (U) and a downstream side (D), the valve comprising:
a flow stem (22) having an upstream entry (23) and a downstream exit (25), the flow stem (22) configured to regulate pressures within a portion of an irrigation system to which the valve is connected;
a valve command port (20) configured to receive a command signal, the valve command port (20) having a command port axis (C) which is transverse to the longitudinal axis (A); and
a movable plug (30) located upstream of the flow stem (22), the plug (30) configured to shut off liquid flow through the valve (12) by moving towards the downstream side in a direction transverse to the command port axis (C) and sealing the upstream entry (23) of the flow stem (22), in response to an incoming command received at the valve command port (20).

20. The valve of claim 19, wherein:
the flow stem (22) is configured to move in both upstream and downstream directions to regulate pressure downstream of the valve; and
upstream and downstream movement of the flow stem (22) changes a passage formed between the flow stem (22) and the plug (30).

21. The valve of claim 20, wherein increase and decrease of said passage affects increase and decrease in pressure downstream of the valve, respectively.

22. A flow regulating irrigation valve having a longitudinal axis (A), the longitudinal axis (A) defining an upstream side and a downstream side, the valve comprising:
a pressure regulating mechanism for regulating pressures within a portion of an irrigation system to which the valve is connected; and
a shut-off mechanism located upstream of the pressure regulating mechanism and configured to override the pressure regulating mechanism, and shut-off liquid flow through the valve, wherein:
in response to an incoming pressure command received at a valve command port (20) having a command port axis (C) transverse to the longitudinal axis (A), at least a portion of the shut-off mechanism is configured to move towards the downstream side in a direction transverse to the command port axis (C), to shut-off liquid flow.

23. The valve according to claim 22, further comprising a valve housing, wherein the pressure regulating and shut-off mechanisms are both located within the valve housing.

24. The valve according to claim 22, wherein the shut-off mechanism includes a plug configured to interact with the pressure regulating mechanism to assist in regulating pressures.

25. An irrigation system comprising:
a valve in accordance with claim 22;
a main irrigation pipe coupled to the downstream side of the valve;
a plurality of drip irrigation pipes connected to the main irrigation pipe and configured to supply irrigation liquid to crops in an irrigation field; and
an external controller configured to selectively cause an incoming pressure command to be presented to the shut-off mechanism to shut-off flow of irrigation fluid to the main irrigation pipe.

26. The valve according to claim 1, wherein:
the valve command port (20) has a command port axis (C) which is transverse to the valve's longitudinal axis (A); and
the incoming command received at the valve command port (20) urges the plug (30) in a direction transverse to the command port axis (C).

\* \* \* \* \*